(12) United States Patent
Prasad et al.

(10) Patent No.: US 6,735,097 B1
(45) Date of Patent: May 11, 2004

(54) METHOD AND APPARATUS OF USING LEAKAGE INDUCTANCE AS A BOOST INDUCTOR

(75) Inventors: Atluri R. Prasad, Houston, TX (US); Hai N. Nguyen, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/324,542

(22) Filed: Dec. 19, 2002

(51) Int. Cl.[7] ................................................ G05F 1/00

(52) U.S. Cl. ................................... 363/44; 363/48

(58) Field of Search .............................. 363/44, 45, 17, 363/48, 47

(56) References Cited

U.S. PATENT DOCUMENTS

| | | | |
|---|---|---|---|
| 5,559,395 A | * | 9/1996 | Venkitasubrahmanian et al. ........................ 315/247 |
| 5,844,790 A | | 12/1998 | Jacobs et al. ................. 363/47 |
| 5,959,849 A | | 9/1999 | Batarseh et al. .............. 363/16 |
| 6,181,084 B1 | * | 1/2001 | Lau ............................ 315/291 |
| 6,194,880 B1 | | 2/2001 | Fraidlin et al. ............. 323/222 |
| 6,239,584 B1 | | 5/2001 | Jang et al. ................... 323/222 |
| 6,272,027 B1 | | 8/2001 | Fraidlin et al. ............... 363/26 |
| 6,385,057 B1 | * | 5/2002 | Barron ........................ 363/17 |

* cited by examiner

*Primary Examiner*—Bao Q. Vu

(57) ABSTRACT

The specification discloses a power factor corrected switching power supply. The power factor corrected switching power supply may utilize, in whole or in part, leakage inductance of a common-mode choke to provide boost inductance.

26 Claims, 2 Drawing Sheets

METHOD AND APPARATUS OF USING LEAKAGE INDUCTANCE AS A BOOST INDUCTOR

BACKGROUND

In recent years, the size of computers has tended to decrease despite the fact that the computing capabilities of computers has tended to increase. The size reduction may be attributable in part to the continuing push to develop smaller packaging for computer components. One exception to this trend toward smaller packaging of computer components is in the area of power supplies. While the size of computer components has generally decreased, power supplies have not.

Most computers sold commercially implement power factor corrected switching power supplies and/or power factor correction circuits. Power factor is a measure of the cosine of the angle between the alternating current voltage signal and supplied alternating current signal. Power supplies and circuits that implement power factor correction attempt to bring the power factor as close to unity as possible regardless of the power delivered by or through them.

The size of power factor corrected switching power supplies has remained relatively constant due mostly to the size of the common-mode inductors (acting as electromagnetic interference filters), as well as the size of boost inductors. The common-mode and boost inductors may have a primary winding and a secondary winding, coupled by magnetic material through which the magnetic flux flows. Because of this construction, common-mode and boost inductors may be bulky and thus limit the ability to achieve size reductions.

The present invention may address one or more of the above issues.

BRIEF DESCRIPTION OF THE DRAWINGS

For a detailed description of embodiments of the invention, reference will now be made to the accompanying drawings in which.

NOTATION AND NOMENCLATURE

Figure 3:
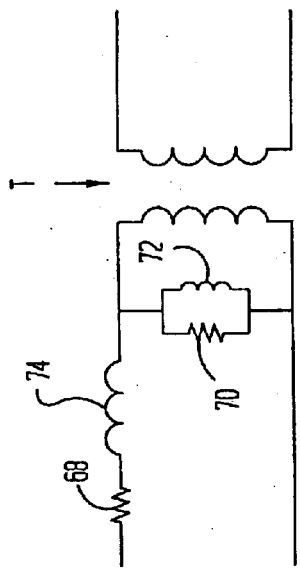
FIG. 3 represents a model of a transformer winding in accordance with embodiments of the invention.

Certain terms are used throughout the following description and claims to refer to particular system components. As one skilled in the art will appreciate, computer and power supply companies may refer to a component by different names. This document does not intend to distinguish between components that differ in name but not function. For example, a common-mode inductor may be equivalently referred to as a common-mode choke or a common-mode filter.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

In the following description, common reference numerals are used throughout the various embodiments and figures to denote that similar components may be utilized. It should be understood, however, that components may vary between embodiments, and thus the use of a common reference number is not intended to limit the invention to the particular components. Further, the present invention is not intended to be limited in its application to the embodiments illustrated. The embodiments are merely examples of some ways in which general principles of the present invention may be implemented.

DETAILED DESCRIPTION OF THE PREFERRED EMBODIMENTS

Figure 1:
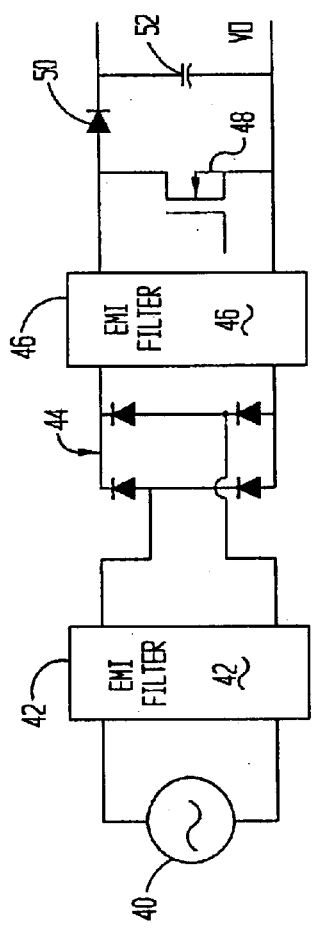
FIG. 1 illustrates a power factor corrected switching power supply in accordance with embodiments of the invention.

Referring initially to FIG. 1, a power factor corrected switching power supply constructed in accordance with embodiments of the invention that may comprise a first electromagnetic interference (EMI) filter 42 that couples between a source 40 and a rectifying bridge 44. The power factor corrected switching power supply also may include a second EMI filter 46 coupled between the rectifying bridge 44 and other downstream components, such as a boost switch 48, boost diode 50 and output capacitor 52. The combination of the first and second EMI filters 42, 46 may perform noise filtering, for example, to bring a power factor correction device, such as that shown in FIG. 1, in compliance with regulatory standards.

Figure 2:
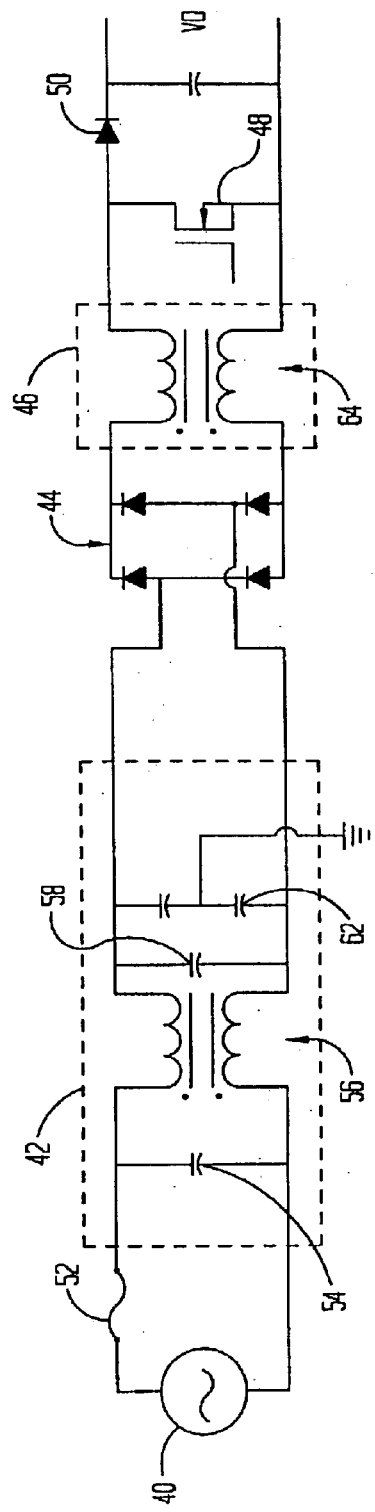
FIG. 2 illustrates, in more detail, the power factor corrected switching power supply of FIG. 1 in accordance with embodiments of the invention.

Referring now to FIGS. 1 and 2, the source 40 may couple to the first EMI filter 42 through a fuse 52. The first EMI filter of this and other embodiments may comprise an input capacitor 54, as well as a common-mode filter 56. The down-stream terminals of the common-mode filter 56 may couple to a phase-to-phase (X) capacitor 58 as well as one or more phase-to-ground (Y) capacitors (two such capacitors 60, 62 are depicted in the representative embodiment of FIG. 2). The output terminals, and therefore the output signals, of the first filter 42 may couple to the full wave bridge 44. Full wave bridge 44 may convert the alternating current (AC) signal supplied by the source 40, and passed through the first EMI filter 42, to a direct current (DC) signal having a ripple at twice the frequency of the source 40. The second EMI filter 46 may comprise a common-mode filter 64 that is coupled to the rectified signal; that is, as shown in the representative embodiment of FIG. 2, common-mode filter 64 couples on its input terminals to the full wave bridge 44, and couples on its output terminals to the boost diode 50 and the boost switch 48. As illustrated in FIG. 2, the second EMI filter 64 may be configured without X capacitors or Y capacitors.

To understand the operation of the circuits of FIGS. 1 and 2 may require first a realization that the common-mode filter 64 may comprises a one-to-one transformer that operates on principles similar to any transformer. This means that the common-mode filter 64 (or 56) may experience undesired power loss in transferring power from the primary to the secondary, resulting in a loss of efficiency. The loss of efficiency may be caused, in part, by magnetic flux leakage that does not couple the primary to the secondary winding, which results in self-inductance of one winding, or the other, and therefore leakage inductance.

FIG. 3 illustrates a model of one winding of a transformer that may be used as common-mode filter. A transformer winding may be made of a metallic material, such as copper, that has an electrical resistance. As electrical currents circulate through the winding, heat may be created. In the model of a transformer winding of FIG. 3, resistor 68 may represent the resistance of the winding to which it pertains. Further, alternating electrical current flowing in a winding of a transformer may induce a flow of magnetic flux within the magnetic material coupling two transformer windings. Much like the metallic windings, the magnetic material coupling the windings is not ideal, and as magnetic flux circulates, heat is created which results in a loss of power that would have otherwise been delivered to output terminals of the transformer. Resistor 70 in the model of a transformer winding of FIG. 3 may model inefficiencies in the magnetic material.

Still referring to FIG. 3, some of the electrical current which flows in a primary winding of a transformer may be dedicated to producing necessary magnetic fields, and this current may be known as magnetizing current. Electrical current supplied at the input terminals of a transformer which forms a part of the magnetizing current may not be available for the creation of magnetic flux, therefore representing another loss of efficiency. Inductor 72 of FIG. 3 may model the inefficiency associated with the magnetizing current.

Still referring to FIG. 3, because of imperfections in the winding process, not all of the magnetic flux generated by electrical current flowing in a primary winding of a transformer may couple or cut a secondary winding. Instead, this magnetic flux may couple only to the winding, that generated the flux, which may result in inductance—leakage inductance. Inductor 74 is intended to model the leakage inductance. Finally, the model represented in FIG. 3 may comprise an ideal transformer T.

The model of the transformer shown in FIG. 3 only represents one winding of the transformer. A similar set of resistances and inductances may be modeled for the secondary side of the transformer as well. The model may show, however, that even a one-to-one transformer operated as a common-mode filter 64 may have a leakage inductance. At some switching frequencies, leakage inductance of some off-the-shelf common-mode inductors or filters may be sufficient to perform, at least in part, the task previously associated with relatively large independent boost inductors.

In some embodiments, the switching frequency applied to the boost switch 48 may be greater than approximately 380 kilo-Hertz. As a general rule, as the switching frequency increases, the amount of boost inductance needed for operation decreases. Certain embodiments of the invention take advantage of this relationship and may increase the switching frequency to the point that the leakage inductance of one or more of the EMI filters may be sufficient to perform some, if not all, of the tasks normally associated with an independent boost inductor. As an example, a leakage inductance of approximately 100 micro-Henries to 150 micro-Henries may be sufficient to operate a power factor corrected switching power supply with a switching frequency applied to the boost switch 48 at approximately 500 kilo-Hertz. This example is meant to be illustrative, and it should be understood that other switching frequencies may be used. In addition, the amount of leakage inductance may vary depending on the power provided by the switching power supply, output voltage level, the common-mode filters used, the configuration of the circuit, and other parameters.

The savings in circuit board space by eliminating a boost inductor may be significant. For example, in a 400 watt power supply, the boost circuit may require about 1½ square inches of board space and 2¼ cubic inches of volume, a majority of which may be dedicated to the boost inductor. By utilizing the leakage inductance of an EMI filter, the need for board space for performing the boost inductor functionality may be significantly reduced. Space savings may also be achieved by using a smaller boost inductor in combination with leakage inductance. For example, if the leakage inductance provided at least 10% of the total boost inductance needed or useful for the power supply, then a smaller individual boost inductor may be utilized to provide additional boost inductance than may be otherwise be required or useful. Generally, if the leakage inductance provides more of the needed or useful boost inductance, then the amount of inductance needed by a separate boost inductor may be reduced.

Figure 4:
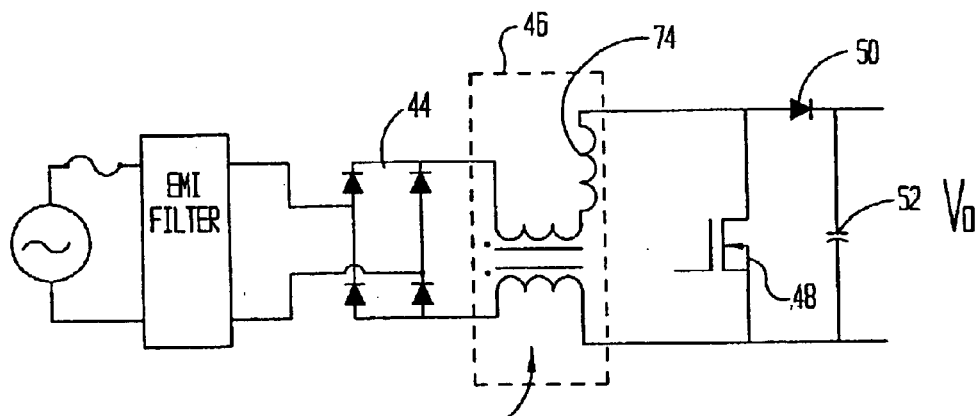
FIG. 4 illustrates a power factor corrected switching power supply circuit diagram in accordance with embodiments of the invention.

Referring generally to FIG. 4, the second EMI filter 46 illustrates the common-mode filter 64 coupled to an individual inductor 74. It should be understood that the inductor 74 may not be an actual component within the power factor corrected switching power supply, but is depicted in FIG. 4 to represent the leakage inductance of the common-mode filter 64 and to aid in the understanding of the operation of the power factor corrected switching power supply. During a charge cycle, when the switch 48 is conducting (i.e. switch 48 is closed), positive current flow moves through the rectifier bridge 44 and through the element 74 representing the leakage inductance. During the charge phase, energy may be stored in the magnetic field of the leakage inductance represented by element 74. When the boost switch 48 opens, the discharge cycle, the electrical current created by the collapsing magnetic field may forward-bias the boost diode 50, providing current to the capacitor 52 and the load (not shown).

Figure 5:
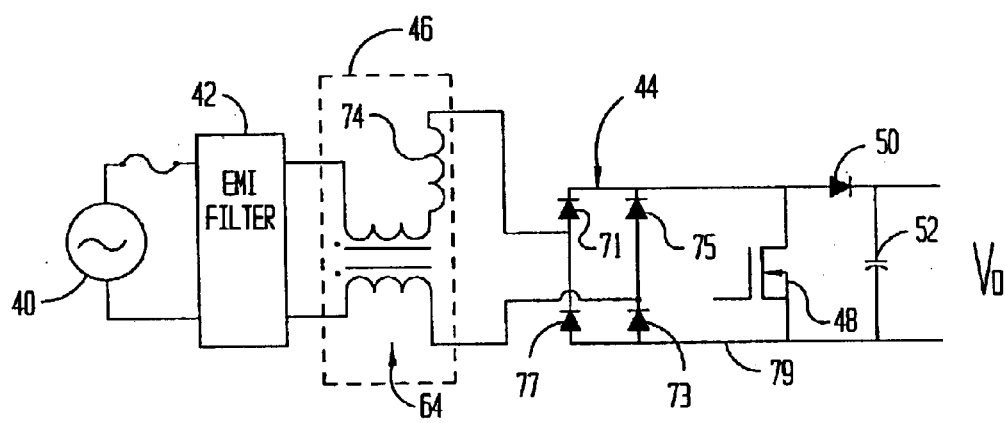
FIG. 5 illustrates a common mode inductor upstream of the rectifying bridge in accordance with embodiments of the invention.

Referring generally to FIG. 5, in some embodiments of the invention, the first EMI filter 42 and a second EMI filter 46 may couple between the source 40 and the rectifier bridge 44. As illustrated in FIG. 5, the rectifier bridge may include diodes 71, 73, 77 and 75. The diodes may be configured in certain embodiments for full-wave rectification. In particular, the anode of diode 71 may couple to a first output terminal of the second EMI filter 46, and a cathode of diode 71 may couple to an anode of boost diode 50. The cathode of diode 77 may couple to the first output terminal of the EMI filter 46, and the anode of diode 73 may couple to an output power return terminal 79. The cathode of diode 73 may couple to the second output terminal of the EMI filter 46, and the anode of diode 77 may couple to the output power return terminal 79. Finally, the anode of diode 75 may couple to the second output terminal of the second EMI filter 46, and a cathode of diode 75 may couple to an anode of boost diode 50.

The second EMI filter 46 may comprise a common-mode filter 64, as well as an inductor 74 that, while not actually a separate physical inductor, is included in the drawing to exemplify the presence of the leakage inductance of the common-mode filter 64. The leakage inductance 74 (which acts as a boost inductor) in the representative embodiment of FIG. 5 is on the AC side of the full wave bridge 44 coupled in an alternating current signal. During a positive half cycle of the voltage source 40, and during the charge cycle, charging current may flow through the leakage inductance 74, diode 71 of the rectifier bridge 44, then through the boost switch 48, and return to the source through diode 73 of the full wave bridge. During the discharge cycle, the boost switch 48 opens and the collapsing magnetic field of the leakage inductance (represented by inductor element 74) forward-biases diode 71 as well as boost diode 50, allowing positive current flow to move to the output capacitance 52 and the load (not shown). During a negative half cycle of the source 40, charging current may flow through diode 75 of the fill wave bridge, through the conducting boost switch 48, through diode 77 of the full wave bridge 44, and then through the leakage inductance 74 acting as the boost inductor. During the discharge cycle, the collapsing magnetic field of the leakage inductance forward-biases diode 75, the boost diode 50 and diode 77.

Figure 6:
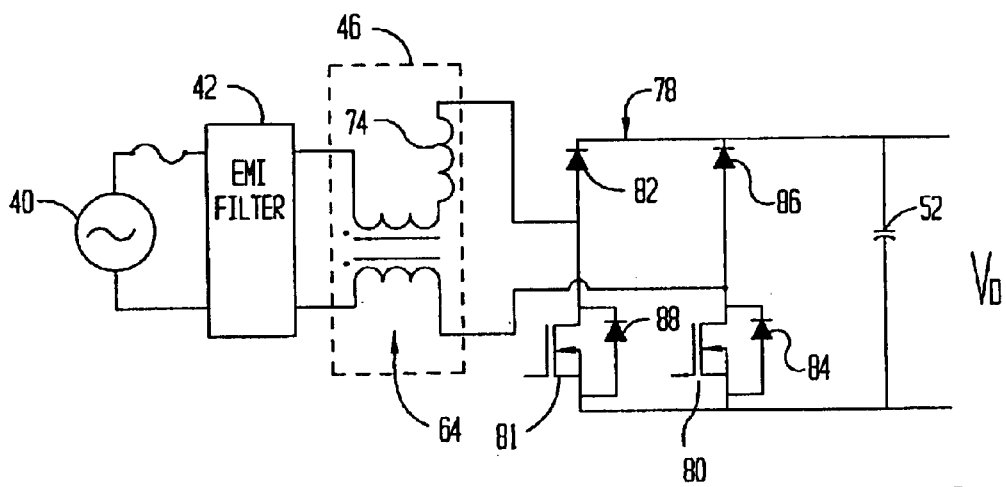
FIG. 6 illustrates a common mode inductor upstream of the integrated bridge device in accordance with embodiments of the invention.

Referring generally to FIG. 6, the rectifier bridge and boost circuit illustrated in FIGS. 1, 2 and 4–6 may be configured as an integrated device 78, with both the first and second EMI filters 42, 46 coupled between the source 40 and the integrated device 78. For a complete description of an integrated bridge and boost circuit, reference is made to co-pending application titled "Power Supply with Integrated Bridge and Boost Circuit" (assigned to the same Assignee) filed Sep. 9, 2002, having Ser. No. 10/237,843 which is incorporated by reference herein as if reproduced in full below.

Although in some embodiments the rectifying bridge and boost circuit may be integrated, the integrated device still performs rectification of the AC signal, and may likewise be referred to simply as a rectifying bridge. As previously discussed, the leakage inductance exemplified by inductor element 74 of the common-mode inductor 64 may be utilized to perform the task normally associated with an independent boost inductor. As is discussed more thoroughly above, during a positive half cycle of the voltage source 40, charging of the boost inductance (represented by the leakage inductor 74) may take place by current flow moving through the leakage inductance 74, through switch 81, and then through switch 80 back to the source.

During a discharge phase (again during the positive half cycle of the voltage source 40), switches 80 and 81 may be turned off, thus forward-biasing diodes 82 and 84, allowing direct current flow to the capacitor 52 and the load (not shown). During a negative half cycle of the voltage source 40, charging of the boost inductance (represented by leakage inductance 74) may take place by current moving first through switch 80, then through switch 81, then through the leakage inductance 74. During a discharge phase (again during the negative half cycle of the voltage source 40), switches 80 and 81 may become non-conductive, and the collapsing magnetic field of the leakage inductance forward-biasing diodes 86 and 88. The above-mentioned application, which has been incorporated by reference, discusses many alternative operational schemes for the integrated bridge and boost circuit 78 that may be implemented in the present invention.

One of ordinary skill in the art, understanding the operation of a power factor corrected switching power supply described herein, could readily specify sizes and values of the various components for operation in any size power supply. In a 400 watt power factor corrected switching power supply, which may be implemented in the manner exemplified FIGS. 1 and 2, each of the common-mode inductors 56, 64 may be designed to have magnetizing inductance for each winding of approximately 2 milli-Henries, and a leakage inductance of approximately 100 micro-Henries, all at 500 kilo-Hertz. The boost switch may comprise any electrically controlled switch that is rated for the desired switching frequency and current. For example, a metal oxide semiconductor field effect transistor (MOSFET) made by Infineon Technologies having a part SPW20N60C3 may be used in the 400 watt power factor corrected switching power supply of this example. Further, in some embodiments, the boost diode may be implemented with a part number SDP06S60, also from Infineon. These are merely examples of parts that may be utilized, and the present invention should not be construed as limited to these implementations.

The above discussion is meant to be illustrative of the principles and various embodiments of the present invention. Numerous variations and modifications will become apparent to those skilled in the art once the above disclosure is fully appreciated. For example, in the illustrated embodiments, EMI filtering occurs in two stages; however, it is contemplated that a single EMI filter, such as 46, may be designed to act simultaneously as a single stage EMI filter and a boost inductor, regardless of which side of the rectifying bridge the EMI filter couples. Further, in some embodiments, it may be possible that a small boost inductor is used in combination with the leakage inductance to perform overall boost induction functionality. It is intended that the following claims be interpreted to embrace all such variations and modifications.

What is claimed is:

1. A method comprising:
   filtering a signal supplied to a switching power supply, having a total boost inductance, using a common-mode filter, the common-mode filter having a leakage inductance associated therewith; and
   operating the switching power supply using the leakage inductance from the common-mode filter as a boost inductance providing at least 10% of the total boost inductance.

2. The method as defined in claim 1 wherein filtering the signal supplied to the switching power supply further comprises filtering the signal after the signal has been converted from an alternating current signal to a direct current signal.

3. The method as defined in claim 2 further comprising alternating between storing energy, and releasing energy, of the leakage inductance.

4. The method as defined in claim 3 wherein alternating between storing energy, and releasing energy, of the leakage inductance occurs at a frequency of greater than approximately 380 kilo-Hertz.

5. The method as defined in claim 1 wherein filtering the power signal supplied to the switching power supply further comprises filtering the power signal prior to conversion to a direct current signal.

6. The method as defined in claim 5 further comprising alternating between storing energy, and releasing energy, of the leakage inductance.

7. The method as defined in claim 6 wherein alternating between storing energy, and releasing energy, of the leakage inductance occurs at a frequency of greater than approximately 380 kilo-Hertz.

8. The method as defined in claim 5 further comprising filtering the signal supplied to the switching power supply prior to conversion to the direct current signal with a second common-mode filter.

9. A switching-type power conversion device having a total boost inductance comprising:
   a rectifying bridge;
   a common-mode inductor coupled to the rectifying bridge, the common-mode inductor having a leakage inductance associated therewith; and
   wherein the leakage inductance of the common-mode inductor is utilized as a boost inductance and provides at least 10% of the total boost inductance.

10. The device as defined in claim 9 further comprising a boost diode coupled to the rectifying bridge, and wherein the common-mode inductor is coupled between the rectifying bridge and the boost diode.

11. The device as defined in claim 9 wherein the common-mode inductor couples to an input terminal of the rectifying bridge.

12. The device as defined in claim 11 wherein the rectifying bridge comprises an integrated rectifying bridge and boost circuit.

13. The device as defined in claim 9 further comprising a boost switch coupled across an output terminal side of the common mode inductor, and wherein the boost switch controls alternating between a charge cycle and a discharge cycle of the boost inductance.

14. The device as defined in claim 13 wherein alternating between a charge and discharge cycle of the boost inductance occurs at a frequency greater than approximately 380 kilo-Hertz.

15. The device as defined in claim 9 further comprising:
   a second common-mode inductor coupled on an input terminal side of the rectifying bridge;
   a line-to-line capacitor coupled on across an output terminal side of the second common-mode inductor;
   a first line-to-ground capacitor coupled from a first output terminal of the second common-mode inductor to one of an electrical ground or common;
   a second line-to-ground capacitor coupled from a second output terminal of the second common-mode inductor to one of an electrical ground or common; and
   wherein each of the common-mode inductors, in combination with the line-to-line and line-to-ground capacitors, form a filter.

16. The device as defined in claim 9 wherein the leakage inductance of the common-mode inductor is used exclusively as the boost inductance.

17. A method comprising:
   operating a switching power supply having a boost inductance at a switching frequency; and
   providing an electromagnetic interference filter with a leakage inductance operative to provide at least 10% of the boost inductance at the switching frequency.

18. The method as defined in claim 17 further comprising operating the leakage inductance in a rectified signal side of the switching power supply.

19. The method as defined in claim 18 further comprising alternating between a charge cycle and a discharge cycle of the leakage inductance.

20. The method as defined in claim 19 wherein the alternating between the charge cycle and discharge cycle takes place at a frequency greater than approximately 380 kilo-Hertz.

21. The method as defined in claim 17 further comprising operating the leakage inductance in an alternating current signal side of a power factor correction circuitry.

22. The method as defined in claim 21 further comprising alternating between a charge cycle and a discharge cycle of the leakage inductance.

23. The method as defined in claim 22 wherein the alternating between the charge cycle and discharge cycle takes place at a frequency greater than approximately 380 kilo-Hertz.

24. A switching power supply comprising:
   a means for filtering electrical noise having a leakage inductance;
   a means for rectifying an alternating current power signal into a direct current power signal having a first voltage level, the means for rectifying coupled to the means for filtering;
   a means for switching coupled to the means for rectifying, the means for switching operating to alternatively charge and discharge a boost inductance; and
   wherein the leakage inductance and the means for switching form a boost circuit that converts the direct current power signal from the first voltage level to a second, higher voltage level, and wherein the leakage inductance provides at least 10% of the boost inductance.

25. The switching power supply as defined in claim 24 further comprising:
   a second means for filtering at least a portion of noise created within the switching power supply from reaching the signal source, and also for filtering noise from the signal source from reaching the switching power supply; and
   said means for filtering also adapted for filtering at least a portion of noise created within the switching power supply from reaching the signal source, and also for filtering noise from the signal source from reaching the switching power supply.

26. The switching power supply as defined in claim 25 the means for filtering and the second means for filtering together form a filter network that meets or exceeds European standard CISPR22-Class B.

* * * * *